United States Patent [19]

Brown

[11] Patent Number: 5,355,623
[45] Date of Patent: Oct. 18, 1994

[54] PLANT POT PROTECTION APPARATUS

[76] Inventor: Darren K. Brown, 2055 Sierra Dr., Elko, Nev. 89801

[21] Appl. No.: 123,115

[22] Filed: Sep. 20, 1993

[51] Int. Cl.$^5$ .............................................. A01G 9/02
[52] U.S. Cl. ............................................ 47/84; 47/25
[58] Field of Search ........................ 47/25 R, 84 C, 25

[56] References Cited

U.S. PATENT DOCUMENTS

| | | | |
|---|---|---|---|
| 1,424,157 | 8/1922 | Cook | 47/48.5 G |
| 2,822,644 | 2/1958 | Berger | 47/25 R |
| 4,308,688 | 1/1982 | Revane | 47/25 |
| 5,142,818 | 9/1992 | Weigert | 47/25 |

FOREIGN PATENT DOCUMENTS

| | | | |
|---|---|---|---|
| 2518441 | 11/1976 | Fed. Rep. of Germany | 47/25 R |
| 2832460 | 2/1980 | Fed. Rep. of Germany | 47/25 |
| 304320 | 1/1933 | Italy | 47/25 R |
| 2053640 | 2/1981 | United Kingdom | 47/25 R |
| 2166031 | 4/1986 | United Kingdom | 47/25 |

*Primary Examiner*—Thuy M. Bui
*Assistant Examiner*—Joanne C. Downs

[57] ABSTRACT

A new and improved protection apparatus is provided for a plant pot. The protection apparatus is installed in the plant pot which contains a quantity of soil and a plant therein. The protection apparatus includes a planar base member and an array of ridge portions that project upward from the planar base member. The ridge portions are arrayed on the planar base member in an alternating arrangement of planar base member portions and ridge portions. A plurality of apertures is located in the planar base member portions for permitting water to pass from the planar base member portions to the soil in the pot. A slot extends through a portion of the planar base member and through respective portions of the respective ridge portions. The slot permits respective opposing portions of the planar base member and the ridge portions which are adjacent to the slot to be separated by a person installing the protection apparatus in the pot. The slot extends from the central aperture to an outer edge of the planar base member. A separable trough assembly is provided which includes an annular trough member and a plurality of hollow spike members projecting downward from the annular trough member into the soil to allow water placed in the trough to seep into the soil through the spikes.

3 Claims, 4 Drawing Sheets

5,355,623

PLANT POT PROTECTION APPARATUS

BACKGROUND OF THE INVENTION

1. Field of the Invention

The present invention relates generally to plants that are grown in plant pots, and, more particularly, to a device especially adapted for protecting the soft in the pot.

2. Description of the Prior Art

Potted plants are in common use in home and business environments. The soil present in potted plants often contains minerals and chemicals that may be harmful if placed in a person's mouth or eaten. Small children and pets are notorious for putting many things and substances in their mouths. Often the children and pets have no knowledge or regard for the potential dangers in doing so. It is a common problem for small children and pets to put soil in their mouth. Therefore, each potted plant is a potential danger to small children and pets who may put soil in their mouths. In this respect, it would be desirable if a device were provided for a potted plant that prevented children and pets from putting soil from potted plants in their mouths.

Potted plants are often ecologically well balanced with respect to their environments. Thus, it is desirable to avoid upsetting the balance of factors that contribute to the balance. Disturbing soil conditions in a potted plant could be one factor in upsetting a good ecological balance. In this respect, it would be desirable if a device were provided for a potted plant that prevented soil from being disturbed and thereby prevented an ecological balance in the plant from being disturbed.

Potted plants come in a wide variety of shapes and sizes. In this respect, it would be desirable if a device were provided for protecting the soil of a potted plant that were readily adaptable to a wide variety of shapes and sizes of pots.

A vital function to be carried out with potted plants is watering the plants. In this respect, it would be desirable if a device were provided for protecting the soil in a potted plant that also had the capability of watering the plant.

Throughout the years, a number of innovations have been developed relating to flower pots, and the following U.S. patents are representative of some of those innovations: U.S. Pat. Nos. 4,795,601; 5,029,412; 5,070,645; 5,085,003; and 5,111,613. Each one of the devices disclosed in the cited patents relates to a device for jacketing the outside of a pot for a potted plant. None of the cited patents discloses a device for protecting the soil in the pot.

Still other features would be desirable in a plant pot protection apparatus. Many devices that are used to protect other devices are complex devices that include moving parts. In this respect, it would be desirable if a device were provided for protecting soil in a potted plant that is simple in structure and has no moving parts.

A device that is constantly exposed to soil and moisture should be resistant to mildew and rot. In this respect, it would be desirable if a device were provided for protecting soil in a potted plant that is resistant to mildew and rot.

Thus, while the foregoing body of prior art indicates it to be well known to use devices to protect pots used for potted plants, the prior art described above does not teach or suggest a plant pot protection apparatus which has the following combination of desirable features: (1) prevents children and pets from putting soil from potted plants in their mouths; (2) prevents soil from being disturbed and thereby prevents an ecological balance in the plant from being disturbed; (3) is readily adaptable to a wide variety of shapes and sizes of pots; (4) has the capability of watering the plant; (5) is simple in structure and has no moving parts; and (6) is resistant to mildew and rot. The foregoing desired characteristics are provided by the unique plant pot protection apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved protection apparatus for a plant pot. The protection apparatus is installed in the plant pot which contains a quantity of soil and a plant therein. The protection apparatus includes a planar base member and an array of ridge portions that project upward from the planar base member. The ridge portions are arrayed on the planar base member in an alternating arrangement of planar base member portions and ridge portions. A plurality of apertures is located in the planar base member portions for permitting water to pass from the planar base member portions to the soil in the pot.

A slot extends through a portion of the planar base member and through respective portions of the respective ridge portions. The slot permits respective opposing portions of the planar base member and the ridge portions which are adjacent to the slot to be separated by a person installing the protection apparatus in the pot. More specifically, the opposing portions of the planar base member and the ridge portions are separated from one another to effectively widen the slot. By effectively widening the slot, the stem of the plant can pass between the opposing edges, and the stem can be located in a central aperture, centrally located in the planar base member with the stem passing through the planar base member. The slot extends from the central aperture to an outer edge of the planar base member.

A separable trough assembly is provided which includes an annular trough member and a plurality of hollow spike members projecting downward from the annular trough member. A handle member is attached to the annular trough member. The handle member is in the shape of a bisected funnel. The hollow spike members are arrayed on the annular trough member such that they are capable of being placed in registration with a corresponding plurality of apertures in the planar base member portions of the planar base member.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least four preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U. S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved plant pot protection apparatus which has all of the advantages of the prior art and none of the disadvantages.

It is another object of the present invention to provide a new and improved plant pot protection apparatus which may be easily and efficiently manufactured and marketed.

It is a further object of the present invention to provide a new and improved plant pot protection apparatus which is of durable and reliable construction.

An even further object of the present invention is to provide a new and improved plant pot protection apparatus which is susceptible of a low cost of manufacture with regard to both materials and labor, and which accordingly is then susceptible of low prices of sale to the consuming public, thereby making such plant pot protection apparatus available to the buying public.

Still yet a further object of the present invention is to provide a new and improved plant pot protection apparatus which prevents children and pets from putting soft from pored plants in their mouths.

Still another object of the present invention is to provide a new and improved plant pot protection apparatus that prevents soil from being disturbed and thereby prevents an ecological balance in the plant from being disturbed.

Yet another object of the present invention is to provide a new and improved plant pot protection apparatus which is readily adaptable to a wide variety of shapes and sizes of pots.

Even another object of the present invention is to provide a new and improved plant pot protection apparatus that has the capability of watering the plant.

Still a further object of the present invention is to provide a new and improved plant pot protection apparatus which is simple in structure and has no moving parts.

Yet another object of the present invention is to provide a new and improved plant pot protection apparatus that is resistant to mildew and rot.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

With reference to the drawings, a new and improved plant pot protection apparatus embodying the principles and concepts of the present invention will be described.

Figure 1:
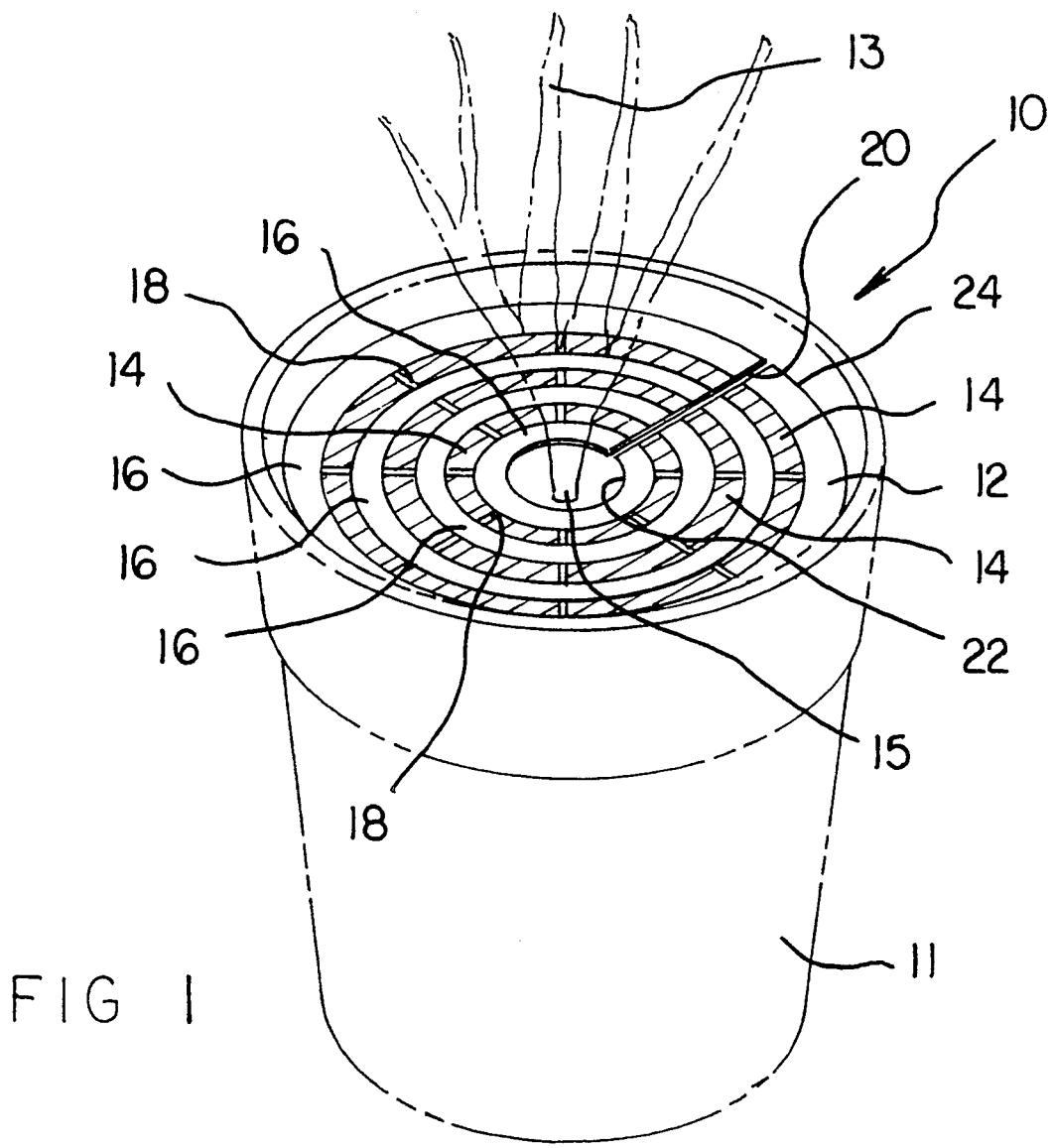
FIG. 1 is a perspective view showing a first preferred embodiment of the plant pot protection apparatus of the invention installed in a pot in which a plant is growing.
Figure 2:
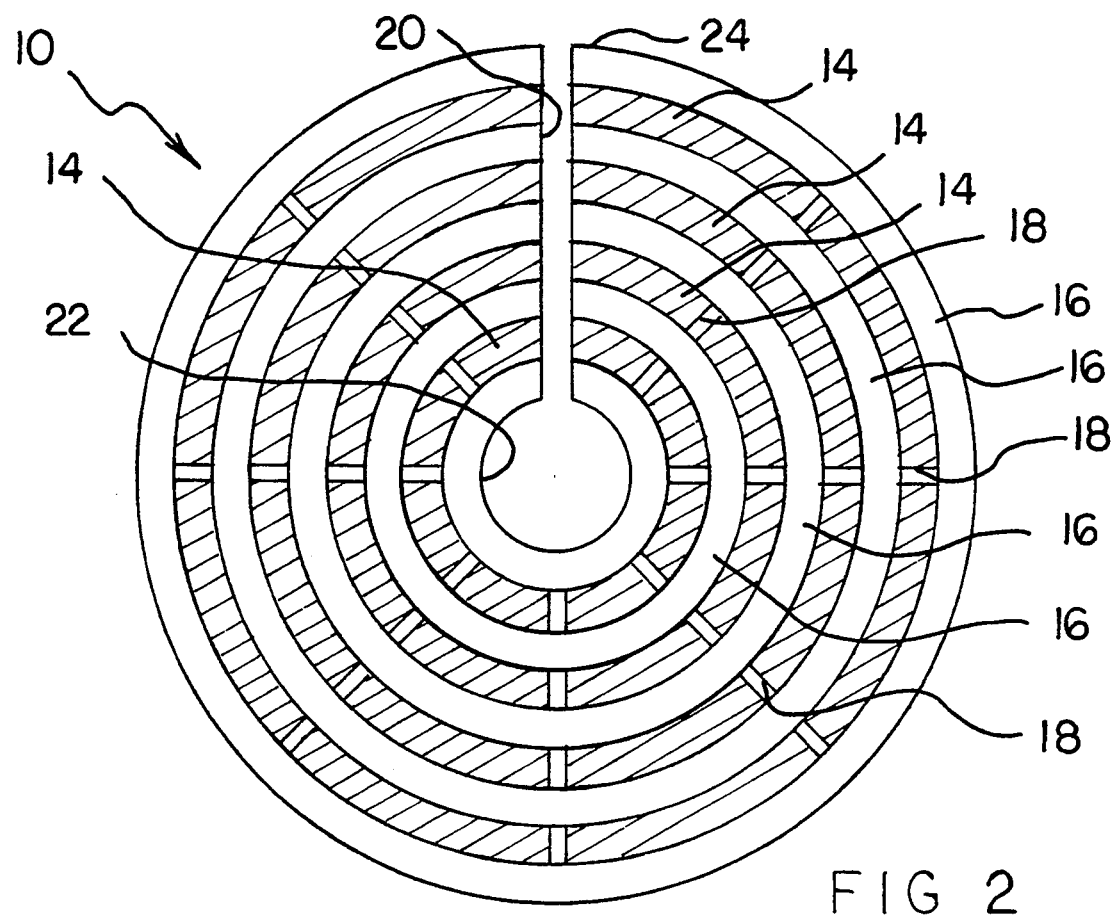
FIG. 2 is an enlarged top view of the embodiment of the invention shown in FIG. 1 without the plant or the pot being present.

Turning initially to FIGS. 1-2, there is shown a first exemplary embodiment of the plant pot protection apparatus of the invention generally designated by reference numeral 10. The protection apparatus 10 is provided for a plant pot 11. The protection apparatus 10 is installed in the plant pot 11 which contains a quantity of soil (not shown) and a plant 13 therein. The protection apparatus includes a planar base member 12 and an array of ridge portions 14 that project upward from the planar base member 12. The ridge portions 14 are arrayed on the planar base member 12 in an alternating arrangement of planar base member portions 16 and ridge portions 14. A plurality of apertures 18 is located in the planar base member portions 16 for permitting water to pass from the planar base member portions 16 to the soil in the pot 11.

A slot 20 extends through a portion of the planar base member 12 and through respective portions of the respective ridge portions 14. The slot 20 permits respective opposing portions of the planar base member 12 and the ridge portions 14 which are adjacent to the slot 20 to be separated by a person installing the protection apparatus in the pot. More specifically, the opposing portions of the planar base member 12 and the ridge portions 14 are separated from one another to effectively widen the slot 20. By effectively widening the slot 20, the stem 15 of the plant 17 can pass between the opposing edges, and the stem 15 can be located in a central aperture 22, centrally located in the planar base member 12 with the stem 15 passing through the planar base member 12. The slot 20 extends from the central aperture 22 to an outer edge 24 of the planar base member 12.

Figure 3:
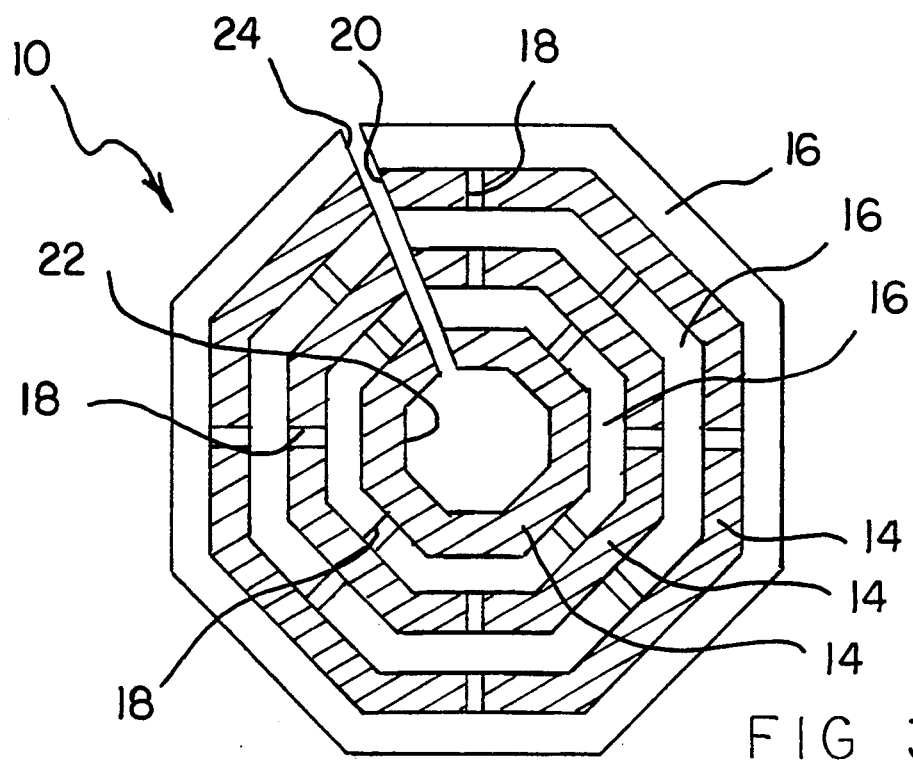
FIG. 3 is a top view of a second embodiment of the invention for a pot having a polygon-shaped top.

A circular embodiment of the invention 10 is shown in FIGS. 1 and 2. A polygonal embodiment is shown in FIG. 3. The plant pot protection apparatus of the invention is preferably made from a plastic material, and the plastic material can be cut by a scissors or a razor blade to be custom fit to a specific pot. Walls of the ridge portions 14 form walls of respective water holders, and the planar base member portions 16 between the walls of the ridge portions 14 form floors of the respective water holders. When water is placed in the water holders, water leaks through the apertures 18 to wet the soil under the planar base member 12. The planar base member 12 and the ridge portions 14 are preferably fabricated from a water-resistant, mildew-resistant, and rot-resistant plastic material, e.g. nylon or polyethylene.

Figure 4:
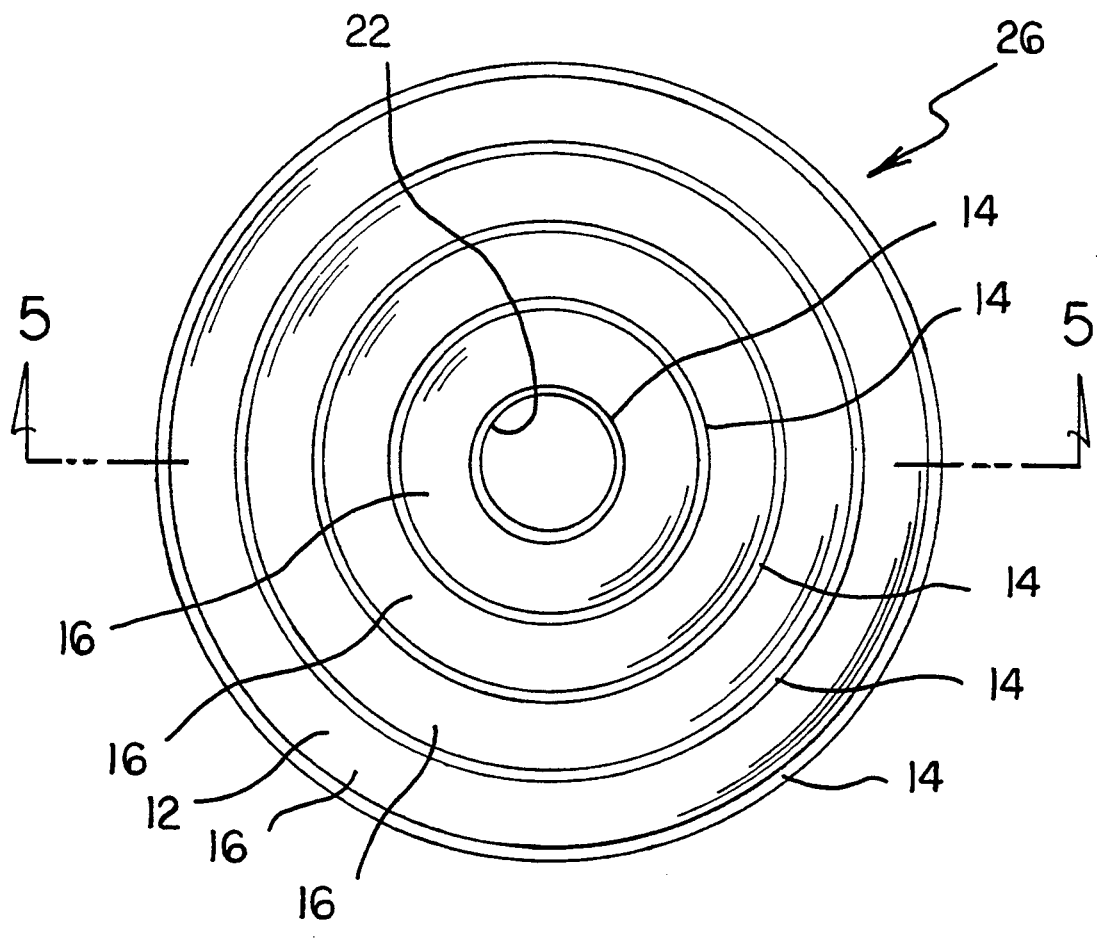
FIG. 4 is a top view of a third embodiment of the plant pot protection apparatus of the invention wherein blank is provided that can be adapted to a specific pot.
Figure 5:
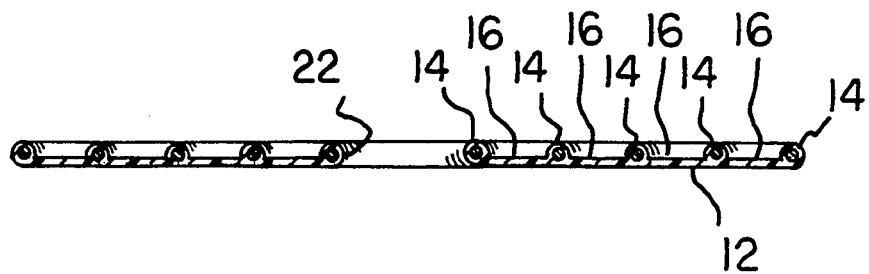
FIG. 5 is a cross-sectional view of the embodiment shown in FIG. 4 taken along,line 5—5 thereof.

Turning to FIG. 4, a third embodiment of the invention is shown. In this embodiment, a blank assembly 26 is provided which includes the following elements: the planar base member 12, the ridge portions 14, and the central aperture 22. What are absent from the blank assembly 26 are the slot 20 and the apertures 18. When the blank assembly 26 is ready to be installed in the pot 11, a slot 20 and a plurality of apertures 18 are cut into the planar base member 12 to provide the plant pot protection apparatus of the invention.

Figure 6:
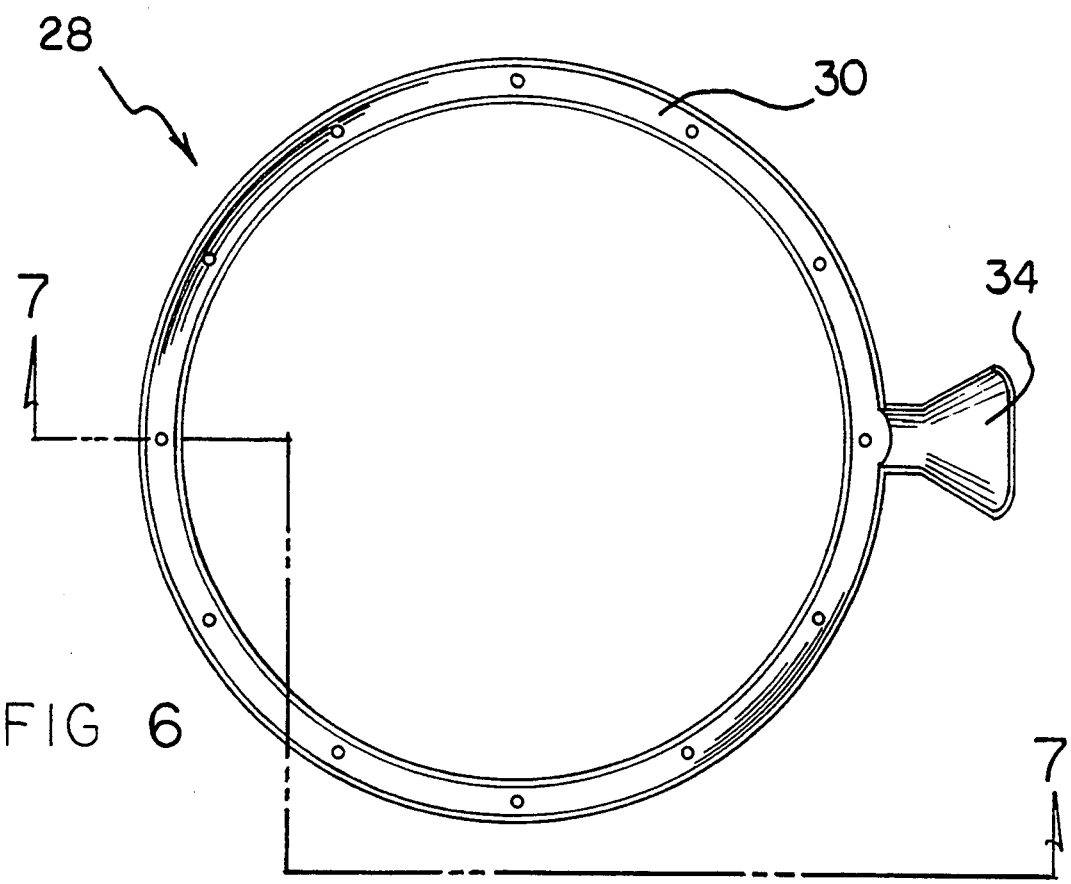
FIG. 6 is a top view of a fourth embodiment of the invention which includes a watering trough for installation on top of soil in a pot.
Figure 7:
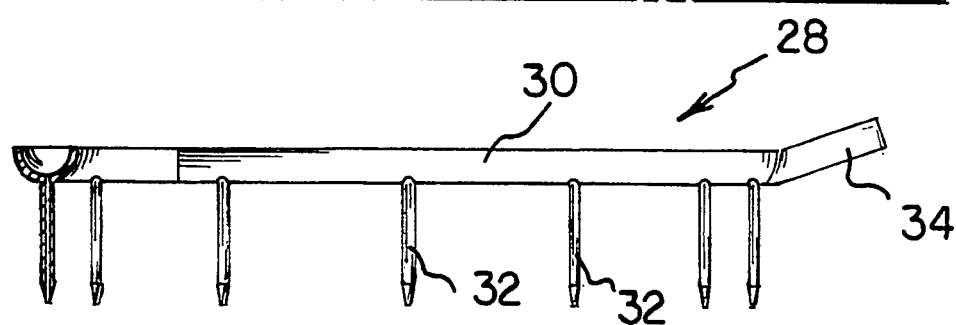
FIG. 7 is a partial cross-sectional and partial side view of the embodiment of the invention shown in FIG. 6 taken along line 7—7 of FIG. 6.
Figure 8:
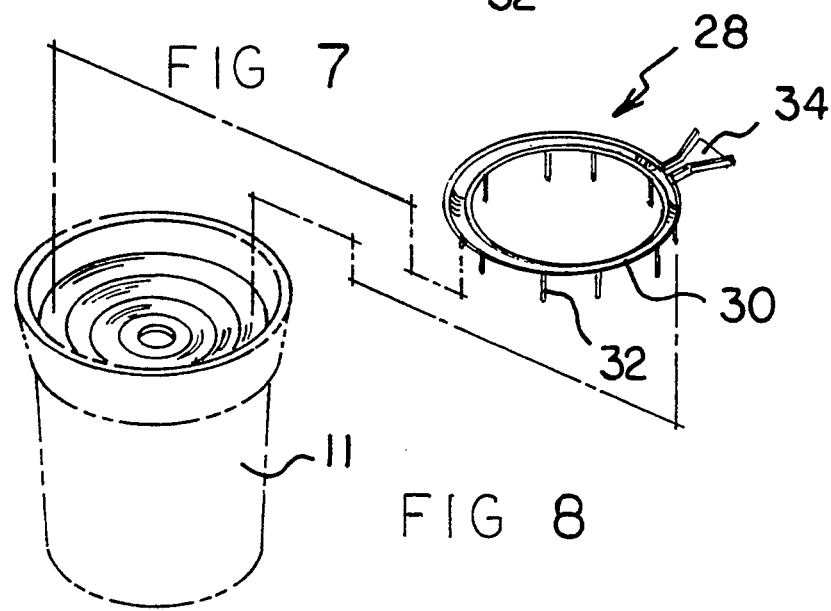
FIG. 8 is an exploded perspective view of the watering trough shown in FIGS. 6 and 7 about to be placed in plant pot.

Turning to FIGS. 6-8, a fourth embodiment of the invention is shown. Reference numerals are shown that correspond to like reference numerals that designate like elements shown in the other figures. In addition, a separable trough assembly 28 is provided which includes an annular trough member 30 and a plurality of hollow spike members 32 projecting downward from the annular trough member 30. A handle member 34 is attached to the annular trough member 30. The handle member 34 is in the shape of a bisected funnel. The hollow spike members 32 are arrayed on the annular trough member 30 such that they are capable of being placed in registration with a corresponding plurality of apertures 18 in the planar base member portions 16 of the planar base member 12. The hollow spike members 32 permit water placed in the annular trough member 30 to seep into the soft below the top of the soil.

The components of the plant pot protection apparatus of the invention can be made from inexpensive and durable plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved plant pot protection apparatus that is low in cost, relatively simple in design and operation, and which may advantageously be used to prevent children and pets from putting soil from potted plants in their mouths. With the invention, a plant pot protection apparatus is provided which prevents soil from being disturbed and thereby prevents an ecological balance in the plant from being disturbed. With the invention, a plant pot protection apparatus is provided which is readily adaptable to a wide variety of shapes and sizes of pots. With the invention, a plant pot protection apparatus is provided which has the capability of watering the plant. With the invention, a plant pot protection apparatus is provided which is simple in structure and has no moving parts. With the invention, a plant pot protection apparatus is provided which is resistant to mildew and rot.

With respect to the above description, it should be realized that the optimum dimensional relationships for the parts of the invention, to include variations in size, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A new and improved protection apparatus for installation in a plant pot which contains a quantity of soil and a plant therein, said apparatus comprising:

a planar base member having a central axis, an array of ridge portions that project upward from said planar base member, said ridge portions arrayed on said planar base member in an alternating arrangement of planar base member portions and ridge portions, said alternating arrangement extending radially with respect to said central axis, a radial slot that extends through a portion of said planar base member and through respective portions of said respective ridge portions, said radial slot permitting respective opposing portions of said planar base member and said ridge portions which are adjacent to said radial slot to be separated for allowing a stem of a plant to pass therebetween for installing the apparatus in the pot, and a central aperture, centrally located in said planar base member, for permitting the stem of the plant to pass through said planar base member, said radial slot extending from said central aperture to an outer edge of said planar base member, further including:

a plurality of spaced apertures located in said alternating planar base member portions for permitting water to pass from said planar base member portions to soil in the pot, a separable trough assembly adapted to be superimposed with respect to said planar base member, said trough assembly including an annular trough member and a plurality of hollow spike members protecting downward from said annular trough member, wherein said hollow spike members are arrayed on said annular trough member such that they are capable of being placed in registration with a corresponding plurality of apertures in said planar base member portions of said planar base member when said separable trough assembly is superimposed with respect to said planar base member.

2. The apparatus described in claim 1, further including: a handle member attached to said annular trough member.

3. The apparatus described in claim 2 wherein said handle member is in the shape of a bisected funnel.

* * * * *